US011131426B1

(12) United States Patent
Fisher

(10) Patent No.: US 11,131,426 B1
(45) Date of Patent: Sep. 28, 2021

(54) MANNEQUIN DISPLAY AND STAGING APPARATUS

(71) Applicant: Donald Fisher, Brentwood, TN (US)

(72) Inventor: Donald Fisher, Brentwood, TN (US)

( * ) Notice: Subject to any disclaimer, the term of this patent is extended or adjusted under 35 U.S.C. 154(b) by 0 days.

(21) Appl. No.: 15/983,573

(22) Filed: May 18, 2018

Related U.S. Application Data

(60) Provisional application No. 62/507,913, filed on May 18, 2017.

(51) Int. Cl.
*F16M 13/02* (2006.01)
*F16M 11/04* (2006.01)
*A47F 8/00* (2006.01)

(52) U.S. Cl.
CPC ............... *F16M 13/02* (2013.01); *A47F 8/00* (2013.01); *F16M 11/04* (2013.01)

(58) Field of Classification Search
CPC ........... F16M 13/02; F16M 11/04; A47F 8/00; F16B 45/02; F16B 45/00
USPC ....... 248/340, 339, 322, 323, 327, 333, 301, 248/303, 304, 692, 448, 449, 176.1, 248/122.1, 124.1, 125.1, 125.3, 443, 453, 248/161, 411, 157, 126, 127, 558, 132, 248/172, 178.1, 179.1, 180.1, 176.3, 248/295.11, 310, 309.1, 305; 211/119.004, 117, 113, 90.02; 108/48
See application file for complete search history.

(56) References Cited

U.S. PATENT DOCUMENTS

| 750,063 | A | * | 1/1904 | Redding | A47B 73/00 211/74 |
| 1,480,829 | A | * | 1/1924 | Moran | A47G 25/0607 211/31 |
| 2,925,916 | A | * | 2/1960 | Pollock | A47B 61/02 211/119.004 |
| 3,989,213 | A | * | 11/1976 | Allen | G10K 11/004 248/214 |
| 5,275,128 | A | * | 1/1994 | Barnes | A01K 15/024 119/706 |
| 5,738,319 | A | * | 4/1998 | Grassi | A47G 7/044 248/215 |
| 6,311,851 | B1 | * | 11/2001 | Knudsen, Sr. | A01G 5/04 211/13.1 |
| 6,590,767 | B2 | * | 7/2003 | Liao | G06F 1/1632 248/917 |
| 7,992,833 | B1 | * | 8/2011 | Goodman | A47G 25/0614 248/298.1 |

(Continued)

FOREIGN PATENT DOCUMENTS

FR 371593 A * 3/1907 ............... A47F 8/00

*Primary Examiner* — Kimberly T Wood
(74) *Attorney, Agent, or Firm* — Patterson Intellectual Property Law, P.C.; Mark A. Kilgore

(57) ABSTRACT

Briefly, the present disclosure relates, in one embodiment, to a mannequin display and staging apparatus for mounting a mannequin to a door. The mannequin display and staging apparatus may include a base panel. At least one door hook may be connected to the base panel. The at least one door hook may be configured to receive a top portion of the door. At least one mannequin hook may be connected to the base panel. The at least one mannequin hook may be configured to receive an attachment portion of the mannequin. A passageway may be defined in the base panel. A rest may include a mounting projection. The mounting projection may be received in the passageway of the base panel.

5 Claims, 16 Drawing Sheets

(56) References Cited

U.S. PATENT DOCUMENTS

| | | | | |
|---|---|---|---|---|
| 8,353,490 | B2* | 1/2013 | Spinelli | F16M 13/02 |
| | | | | 211/118 |
| 8,870,148 | B2* | 10/2014 | Hickman | A47B 97/04 |
| | | | | 211/119.004 |
| 9,166,385 | B2* | 10/2015 | Newman | H02G 1/00 |
| 9,307,700 | B1* | 4/2016 | Schmitt | G09F 17/00 |
| 9,736,992 | B1* | 8/2017 | Barry | A01G 5/04 |
| 2002/0109059 | A1* | 8/2002 | Macri | E04G 3/26 |
| | | | | 248/237 |
| 2007/0221101 | A1* | 9/2007 | Schiel | A61F 2/50 |
| | | | | 108/28 |
| 2009/0050072 | A1* | 2/2009 | Moser | A01K 15/024 |
| | | | | 119/706 |
| 2011/0260026 | A1* | 10/2011 | Ye | F16M 11/04 |
| | | | | 248/298.1 |
| 2013/0240697 | A1* | 9/2013 | Rutigliano | F16M 13/02 |
| | | | | 248/227.1 |
| 2014/0027582 | A1* | 1/2014 | Newman | H02G 1/00 |
| | | | | 248/65 |
| 2014/0291465 | A1* | 10/2014 | Mendoza | F16M 13/02 |
| | | | | 248/346.06 |

* cited by examiner

MANNEQUIN DISPLAY AND STAGING APPARATUS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to a mannequin display and staging apparatus with emphasis on use for high end silicone dolls in the adult industry and capable of holding significant weight, such as about 150 pounds.

Mannequin stands are known in the art. Typically, however, these stands can be bulky and heavy, often requiring disassembly for transportation, and some even requiring multiple people to carry the assembled stand. Furthermore, the typical mannequin stand in this industry takes up a large floor "footprint", and is not easily disguisable.

What is needed, therefore, is a mannequin display and staging apparatus for heavy silicone dolls that may allow a typical home user a way to spontaneously display the mannequin in any room in the home without occupying unnecessary space, and for the first time giving the mannequin owner the illusion that the mannequin is actually standing in the room, rather than hanging from an apparatus. It also may adjust for the various heights of the many models offered by high end doll manufacturers throughout the world.

BRIEF SUMMARY OF THE INVENTION

Briefly, the present disclosure relates, in one embodiment, to a mannequin display and staging apparatus using a standard interior door as an integral brace component which provides the illusion that the mannequin is standing on its own in front of the door. The mannequin display and staging apparatus may include a base panel. At least one door hook may be connected to the base panel. The at least one door hook may be configured to receive a top portion of the door. At least one mannequin hook may be connected to the base panel. The at least one mannequin hook may be configured to receive an attachment portion of the mannequin. A passageway may be defined in the base panel. A rest may include a mounting projection. The mounting projection may be received in the passageway of the base panel.

DETAILED DESCRIPTION OF THE INVENTION

Figure 1:
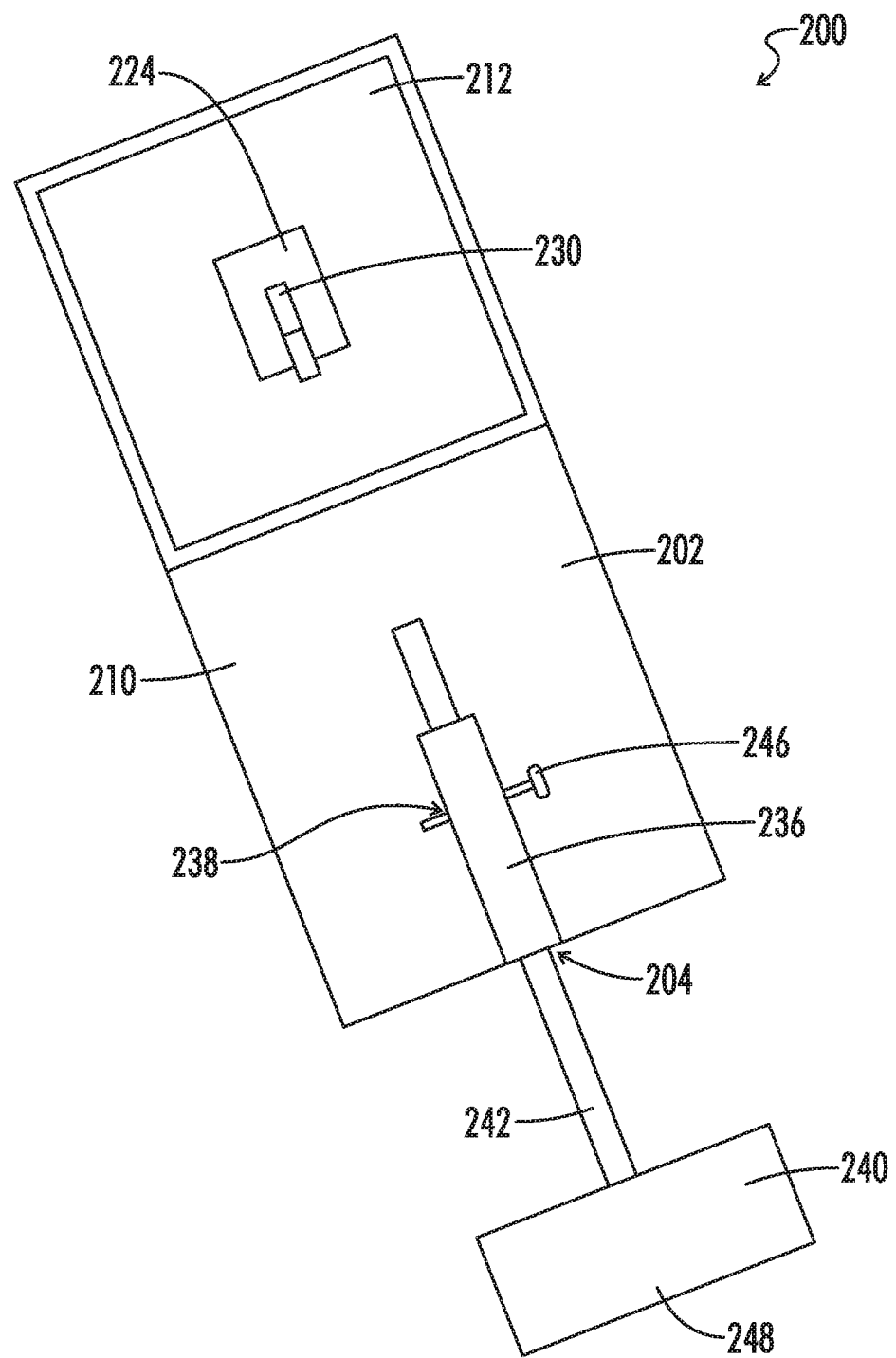
FIG. 1 is a front view of one embodiment of a mannequin display apparatus.

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, one or more sections of hooks and corresponding one or more sections of loops, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

In the prior art, a typical mannequin stand generally is made of a welded metal stand that includes a hook for which a mannequin may be connected by an eyelet found on the mannequin. Further, the mannequin stand may include a lumbar support portion for engaging a lower back portion of the mannequin to keep it upright while hooked to the eyelet. Many mannequin stands did not include wheels making transport of the heavy welded metal mannequin stand difficult. Even with wheels, some users found moving the mannequin stand to be unpleasant and difficult due to the size and weight of the stand. To properly support the weight of the mannequin and provide stable operation, the stands often had large bases which contacted the ground, with the larger the base, the more stable the stand. Often times, the mannequin stands take up a large footprint, making storage of the mannequin or the stand itself difficult in areas with limited areas or limited open floor space.

Figure 2:
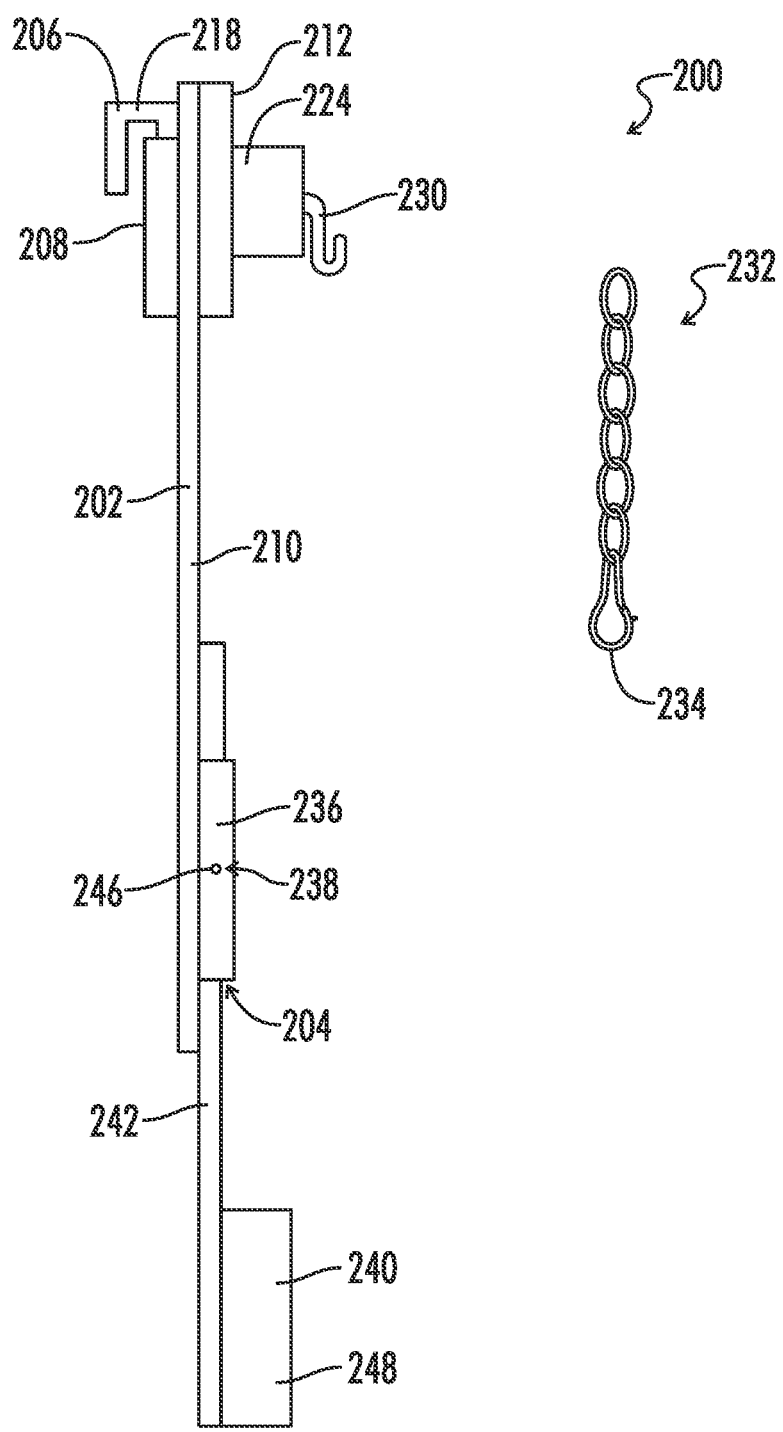
FIG. 2 is a side elevation view of the mannequin display apparatus of FIG. 1.
Figure 3:
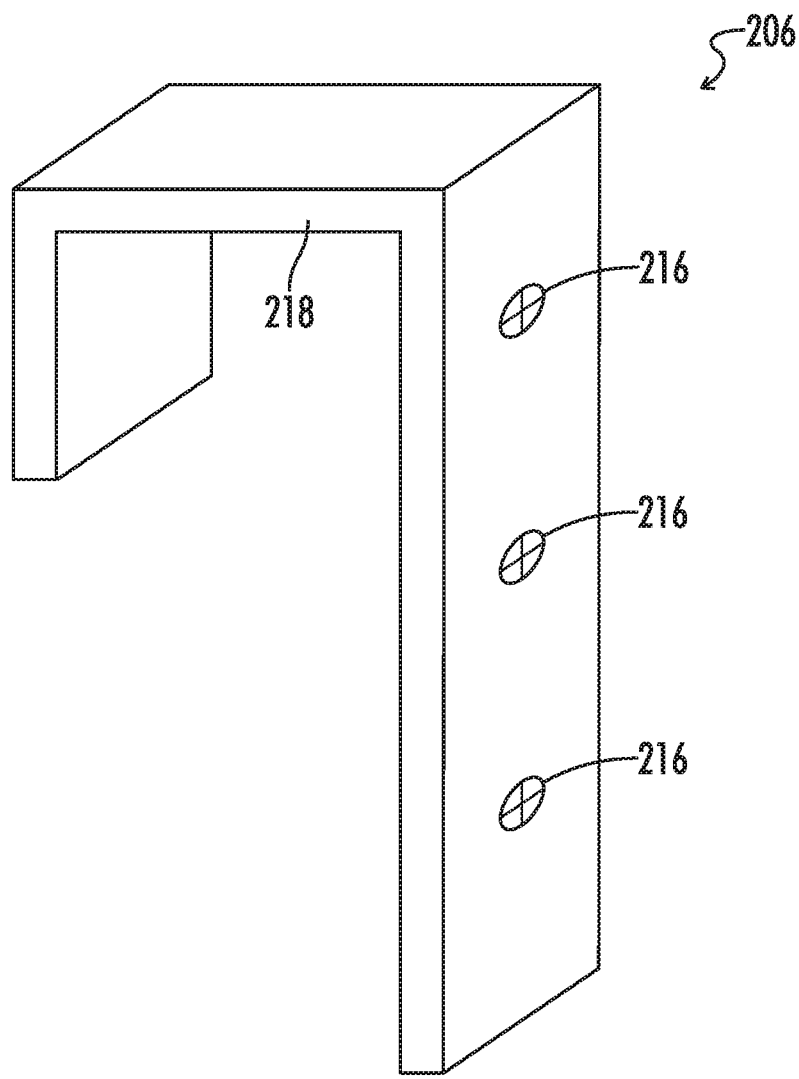
FIG. 3 is an isometric view of a door hook to fit in the grooves of the back plate of FIG. 4 to form a part of the base panel of the mannequin display apparatus of FIG. 1.
Figure 4:
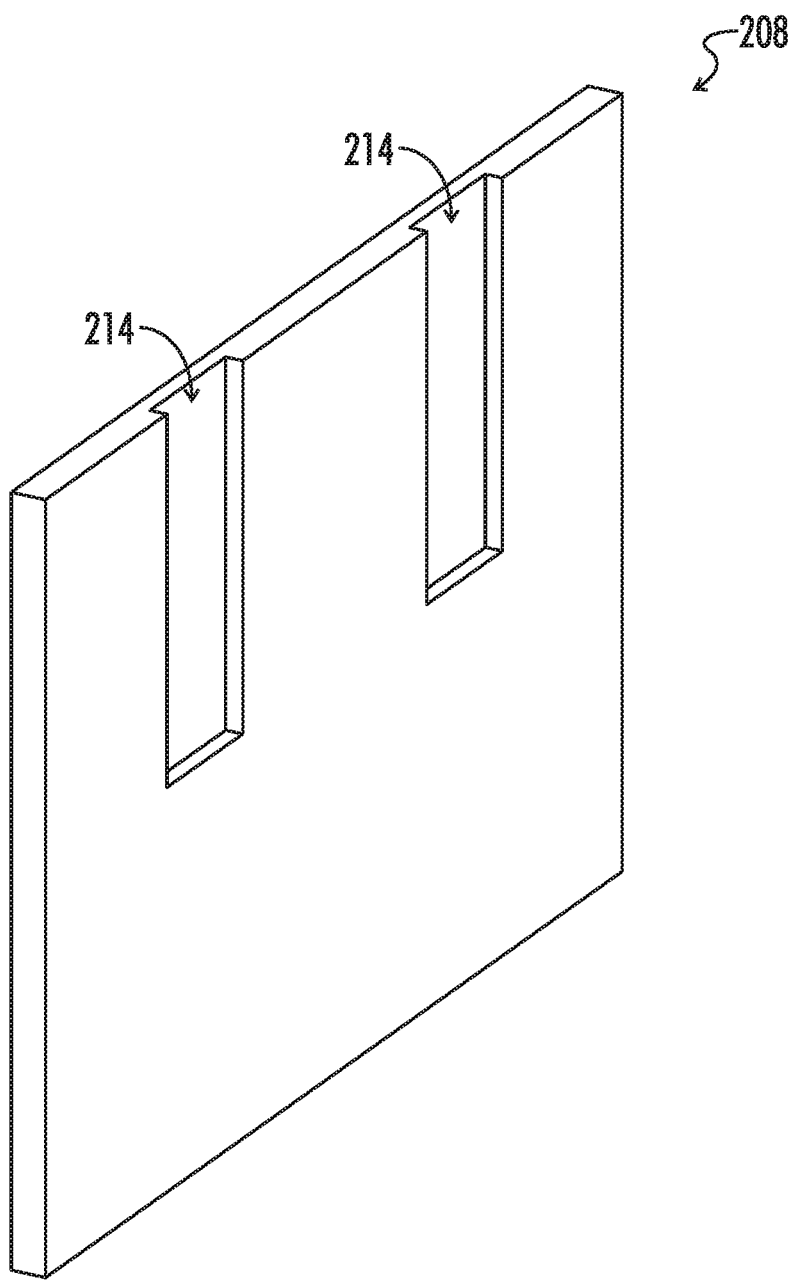
FIG. 4 is an isometric view of a back plate of the base panel of the mannequin display apparatus of FIG. 1.

Turning now to FIGS. 1 and 2, an embodiment of a mannequin display and staging apparatus 200 is shown. The mannequin display and staging apparatus 200 may include a base panel 202. The base panel 202 may include a passageway 204 defined therein. The passageway 204 may be of any appropriate size and shape and may be an opening drilled into the base panel 202, an opening made by connecting material to the base panel, any combination thereof, and the like.

At least one door hook 206 may be connected to the base panel 202. In some embodiments, the door hook 206 is fastened to the back of the base panel 202 with one or more screws. In another embodiment, the door hook 206 may be fastened to the front of the base panel 202.

Figure 8:
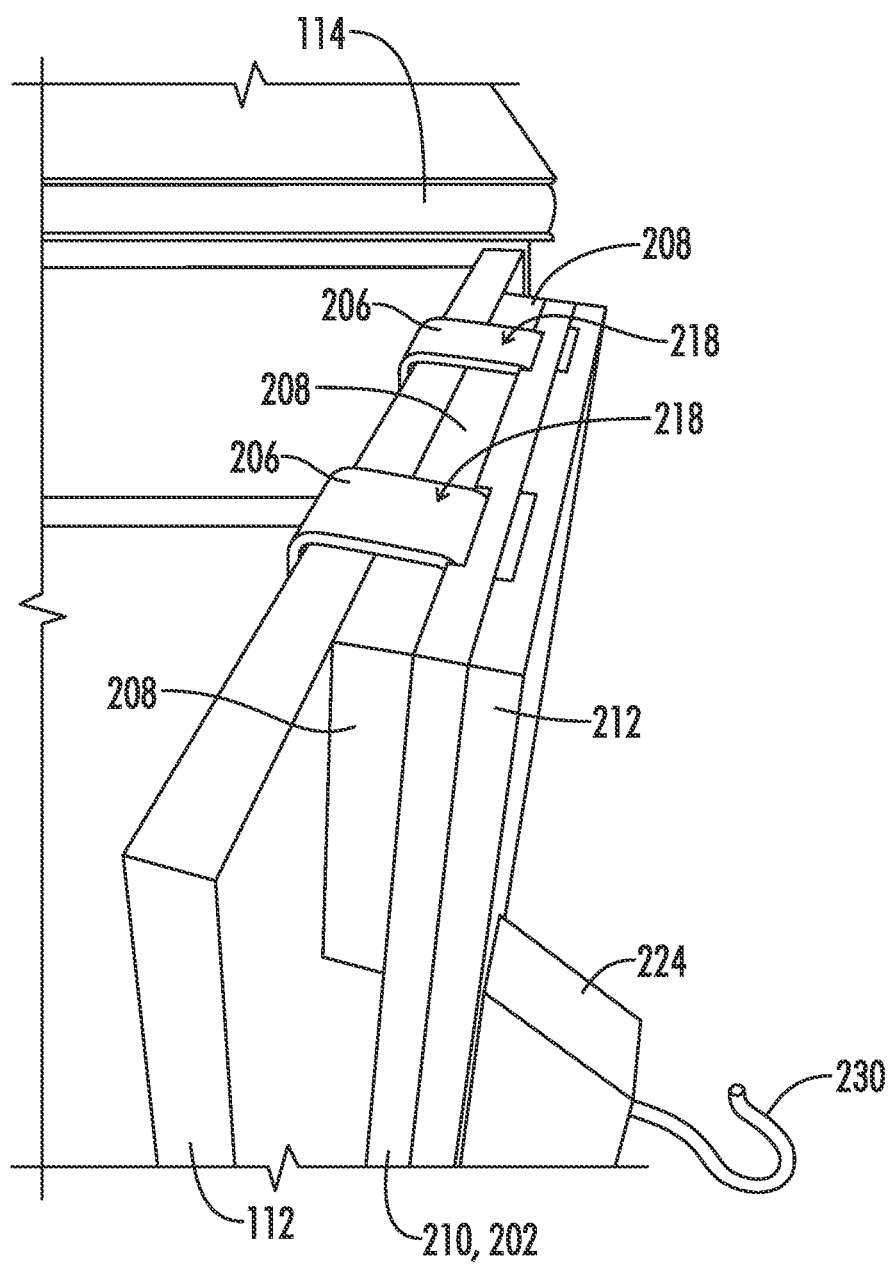
FIG. 8 is a detailed isometric view of the mannequin display apparatus disposed on the door with the hooks traversing over the top surface of the door.
Figure 9:
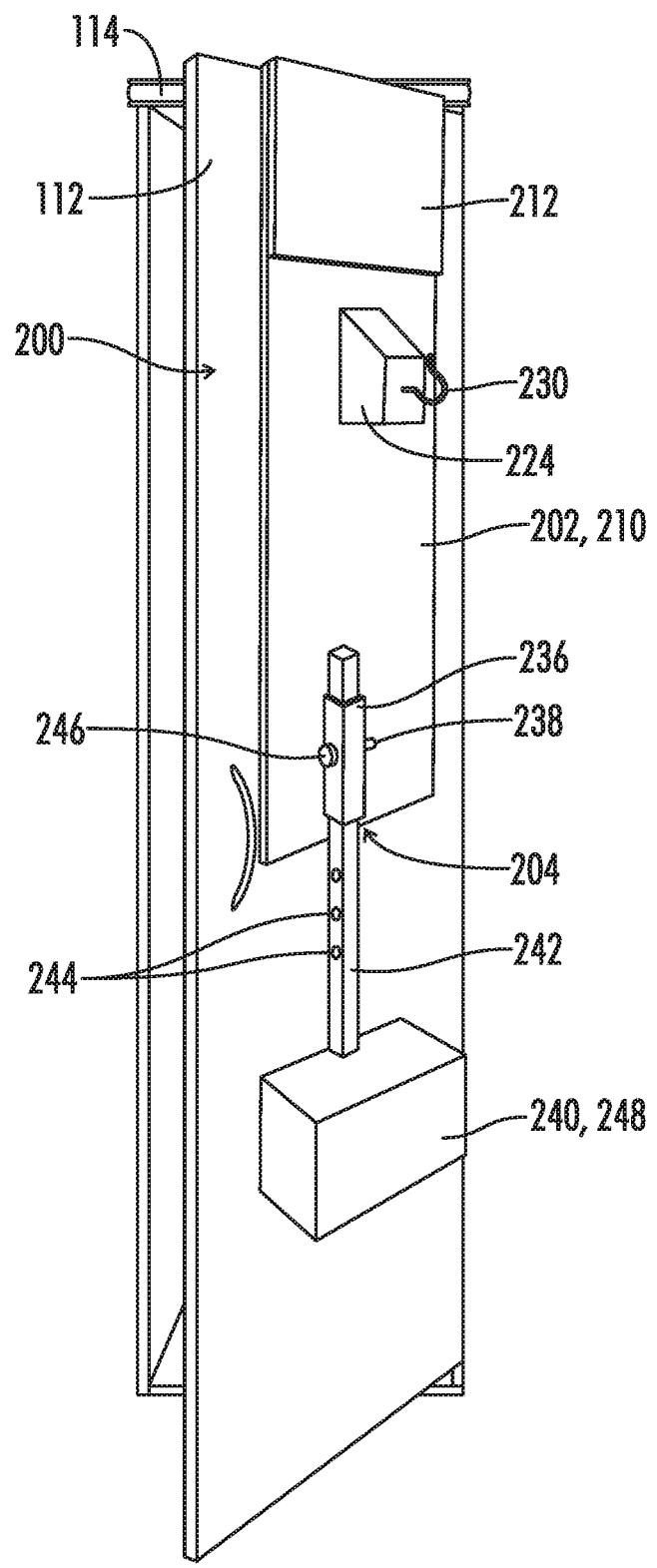
FIG. 9 is an isometric view of FIG. 1 disposed on a door.
Figure 10:
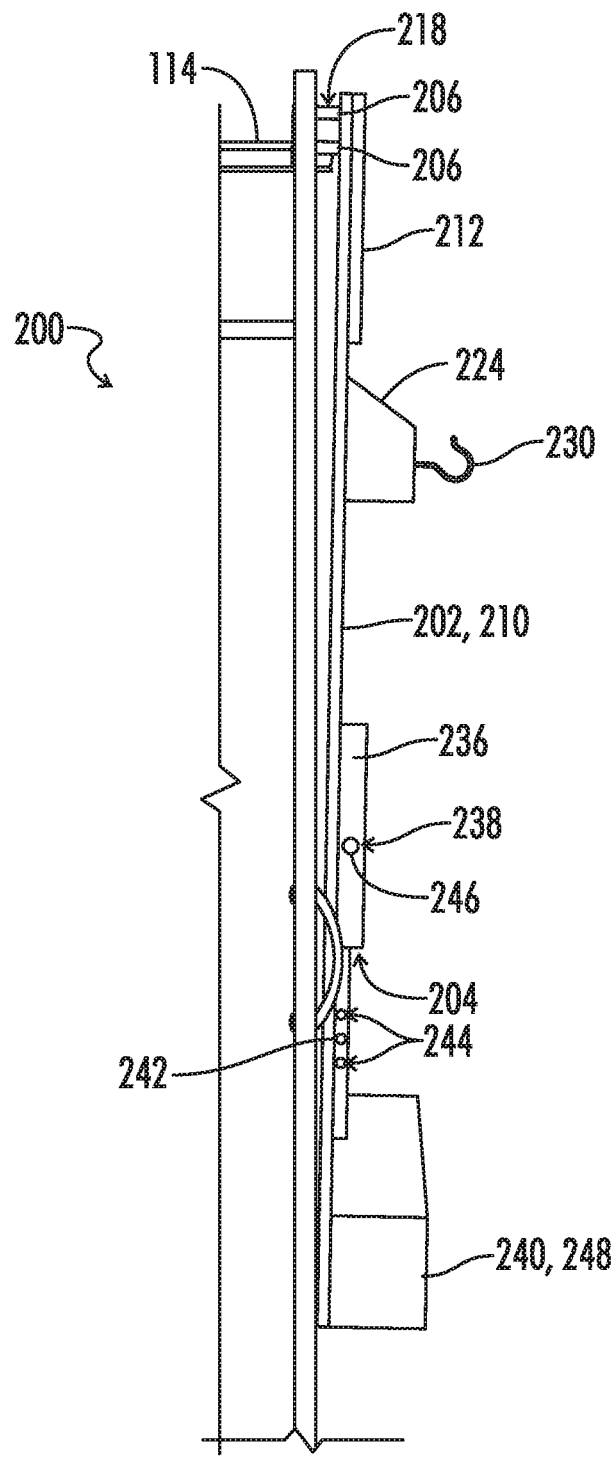
FIG. 10 is a side elevation view of the mannequin display apparatus of FIG. 1 disposed on the door.
Figure 11:
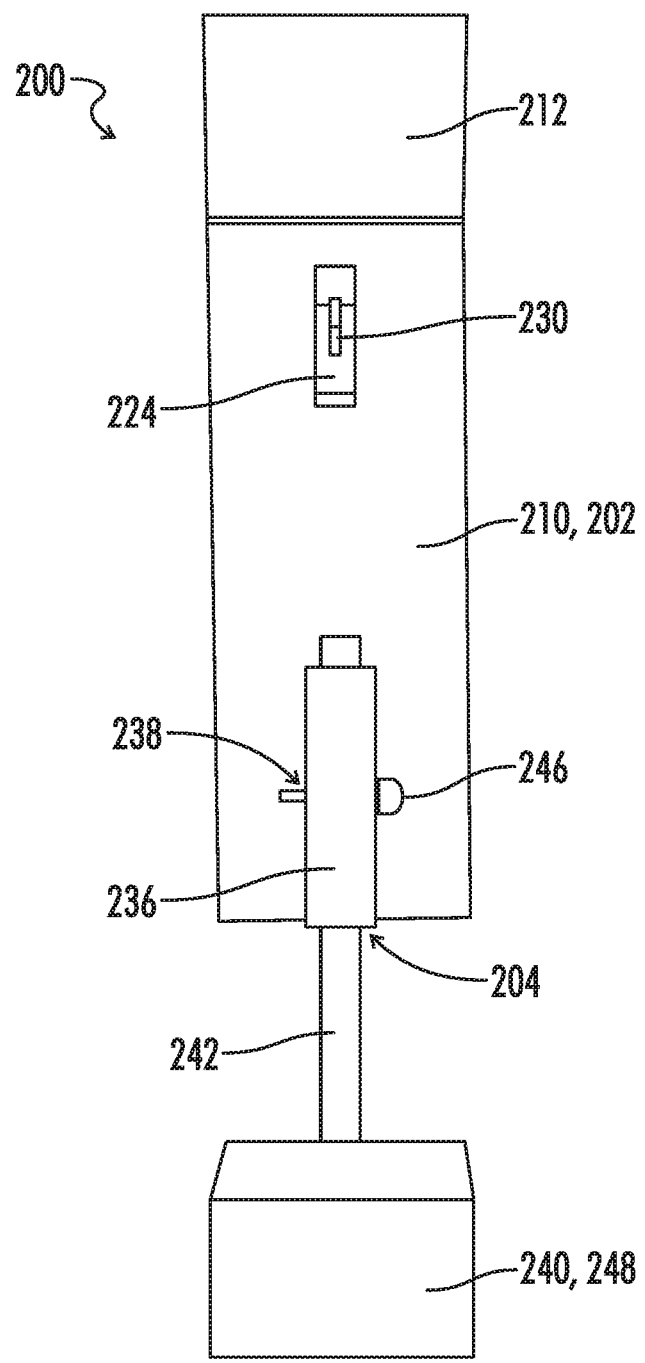
FIG. 11 is a front elevation view of the mannequin display apparatus of FIG. 1.

As shown in FIGS. 3-6, some embodiments of the mannequin display and staging apparatus 200 may include the base panel 202 having: a rear plate 208, the one or more door hooks 206, an intermediate plate 210, and a cover plate 212. The rear plate 208 may include one or more channels 214 to accommodate each respective one of the at least one door hook 206. The at least one door hook 206 may further include one or more connection holes 216 defined therein. The connection holes 216 may allow a fastener, such as a bolt or screw, to pass through the door hook 206 to connect the door hook to the intermediate plate 210. The connection holes 216 may be any appropriate size and shape. The door hook 206 may further include a top section 218. In some embodiments, the top section 218 may be thin enough such that it may pass between a top of a door 112 and the top part of the door frame 114 (See FIGS. 8 and 9). In such embodiments, a door 112 may still be shut when the mannequin display and staging apparatus 200 is disposed on the door.

Figure 5:
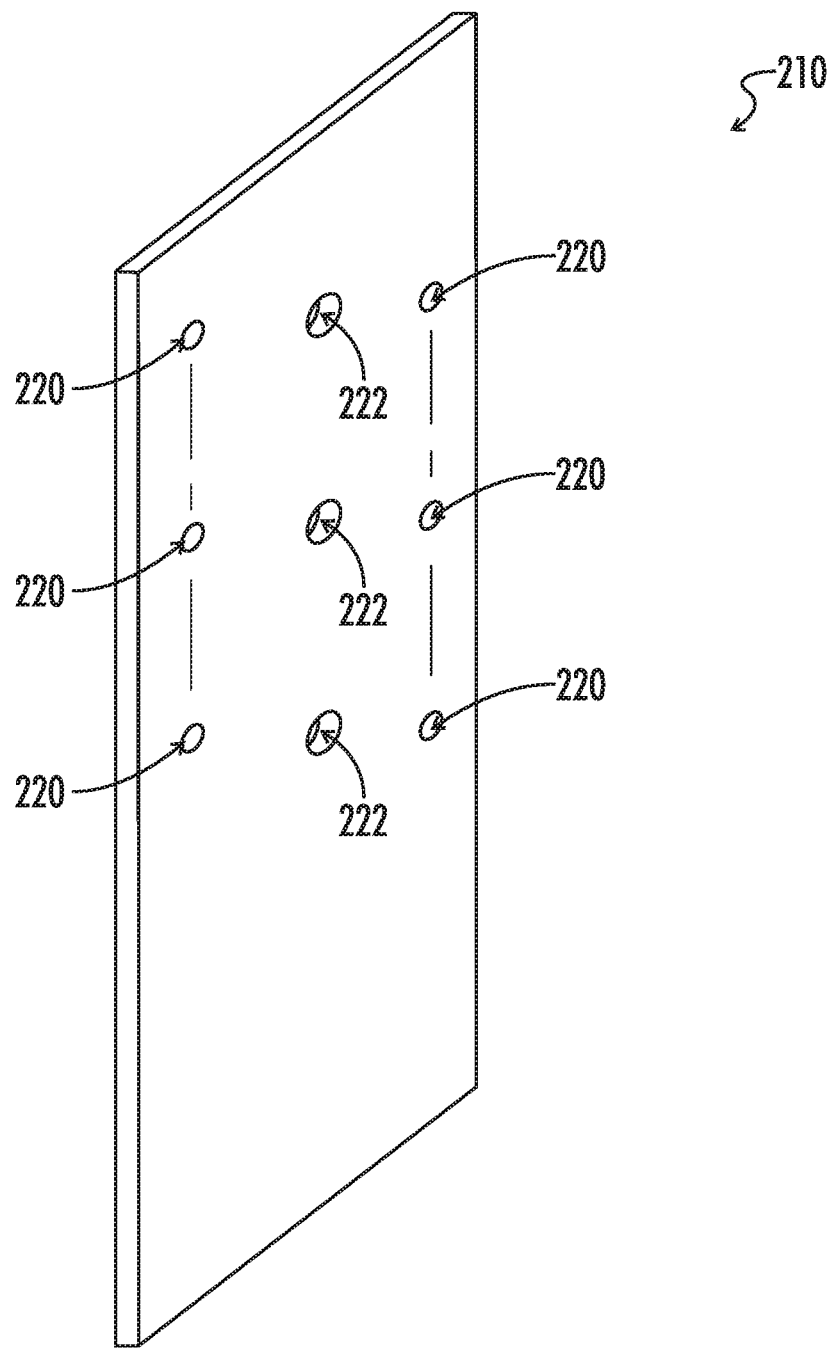
FIG. 5 is an internal metal plate to cover the back plate and the at least one door hook to further assemble the base panel of the mannequin display apparatus of FIG. 1.
Figure 6:
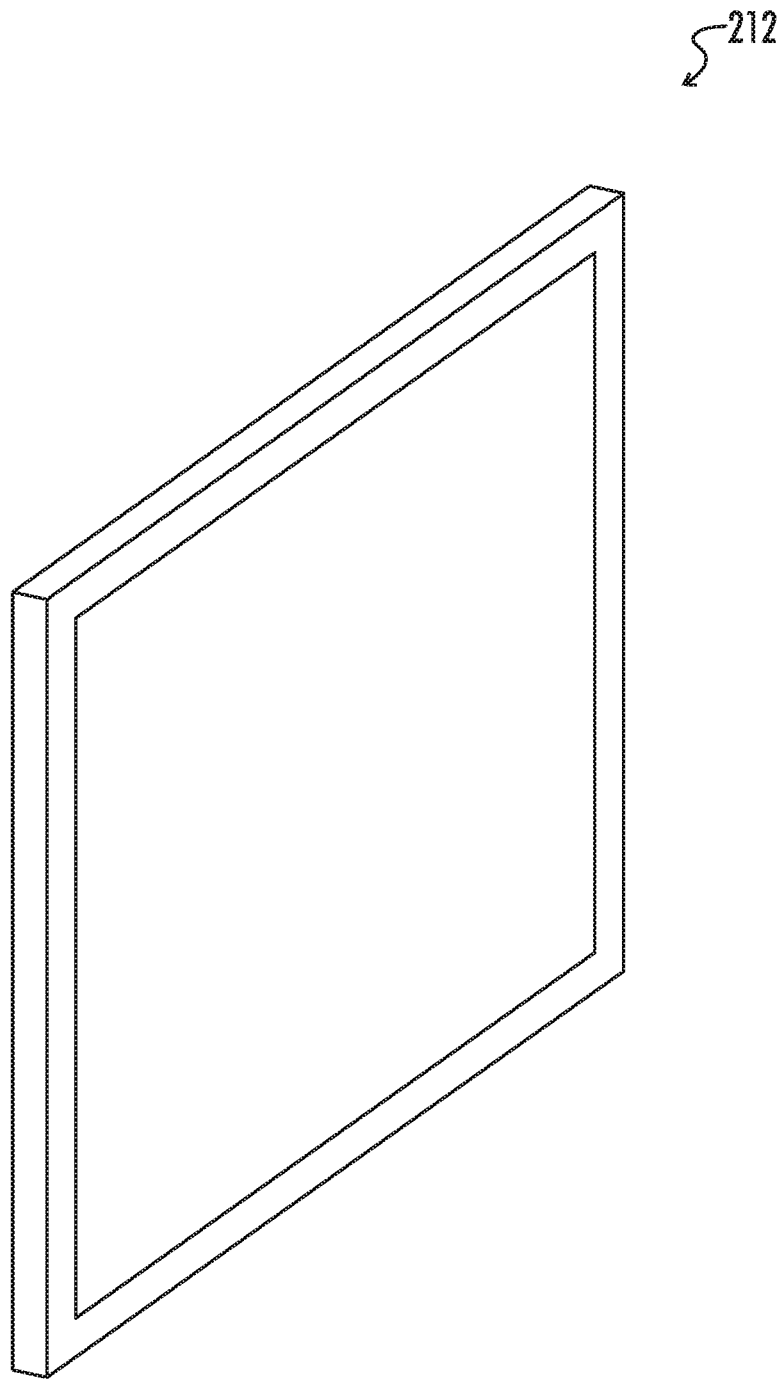
FIG. 6 is an isometric view of a cover plate to cover the internal metal plate to even further assemble the base panel of the mannequin display apparatus of FIG. 1.
Figure 7:
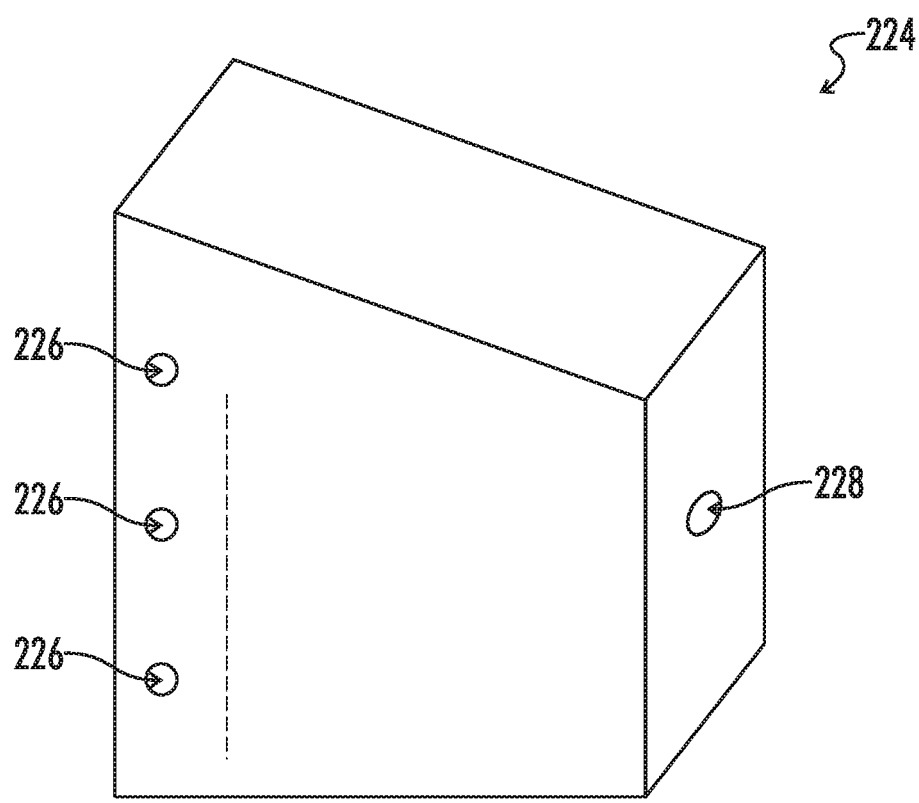
FIG. 7 is an isometric view of a hook support to further still assemble the base panel of the mannequin display apparatus of FIG. 1.

Shown in FIG. 5, the intermediate plate 210 may further include at least one connection hole 220 defined therein. The at least one connection hole 220 of the intermediate plate 210 may correspond to the at least one connection hole 216 of the at least one door hook 206. In one embodiment, each connection hole 220 of the intermediate plate 210 may align with a respective connection hole 216 of the door hook 206. A bolt or screw may then be passed through the connection holes 216, 220 to connect the door hook 206 and the intermediate plate 210. In some embodiments, the rear plate 208 may be on an opposite side of the door hook 206 from the intermediate plate 210. In other embodiments, the rear plate 208 may be disposed between the door hook 206 and the intermediate plate 210. The cover plate 212 may be mounted on the intermediate plate 210 on the opposite side of the intermediate plate from the at least one door hook 206. The cover plate may cover the connection holes 220 of the intermediate plate 210.

The intermediate plate 210 may also include at least one mounting hole 222 defined therein. A mounting block 224 may be connected to the intermediate plate 210. The mounting block 224 may be connected to the intermediate plate 210 by fasteners extending through the at least one mounting hole 222 of the intermediate plate and into at least one corresponding mounting hole 226 defined in the mounting block. In many embodiments, the mounting block 224 may be connected to the intermediate plate 210 directly. In some embodiments, however, the mounting block 224 may be connected to the intermediate plate 210 with the cover plate 212 disposed between the mounting block and the intermediate plate. The mounting block 224 may be of any appropriate size and shape.

A hook opening 228 may also be defined in the mounting block 224. In some embodiments, the hook opening 228 may be defined in a face of the mounting block 224 opposite the face of the mounting block in which the at least one mounting hole 226 is defined. In many embodiments, a mannequin hook 230, such as a screw hook, may be fastened to the mounting block 224 in the hook opening 228. The mannequin hook 230 may suspend the mannequin by the eyelet attached to the mannequin. In some embodiments, however, a chain 232 including a carabiner 234 (Shown in FIG. 1) may be connected between the mannequin hook 230 and the eyelet on the mannequin to more easily suspend the mannequin from the hook.

The passageway 204 of the base panel 202 may be formed, in some embodiments, by a tunnel member 236 connected to the base panel. The tunnel member 236 may be connected directly to the base panel 202 or may be formed integrally with the base panel. The tunnel member 236 may further include a set point opening 238 defined in the tunnel member. In many embodiments, the set point opening 238 may be oriented perpendicularly to the passageway 204 and may intersect with the passageway.

The mannequin display and staging apparatus 200 may further include a rest 240. The rest 240 may include a mounting projection 242 configured to be received in the passageway 204 of the base panel 202. In some embodiments, the mounting projection 242 may include a plurality of adjustment openings 244 defined therein. The adjustment openings 244 may be oriented such that, when the mounting projection 242 is inserted in the passageway 204, the adjustment openings 244 may be substantially parallel with the set point opening 238. In such an embodiment, a user may align the set point opening 238 with a corresponding adjustment opening 244 to adjust how far the rest 240 extends below the base panel 202. Once the desired adjustment opening 244 and the set point opening 238 are aligned, the user may insert a set pin 246 through both the respective adjustment opening and the set point opening to maintain the desired extension distance. This adjustability may allow for mannequins of various heights and sizes to be mounted on the mannequin display and staging apparatus 200. It is contemplated, however, that any form of adjustable connection between the passageway 204 and the mounting projection 242 may be used, including, but not limited to, the use of detent mechanisms, a set screw, a threaded engagement between the components, a threaded tightening collar, a friction fit, any combination thereof, and the like. Additionally or alternatively, various rests may be provided with different respective mounting projections having varied lengths.

The rest 240 may further include a contact body 248. The contact body 248 may be connected to the mounting projection 242. The contact body 248 may further be configured to engage any appropriate location of the mannequin to stabilize the mannequin. In many embodiments, the rest 240 is adjusted such that the contact body 248 makes contact with a lower back portion or buttocks portion of the mannequin. As such, the mannequin may appear to be standing due to the absence of any floor contacting portions of the mannequin display and staging apparatus 200. In some embodiments, a strap or other securing device may be connected to the contact body 248 to further secure a portion of the mannequin to the contact body.

Figure 12:
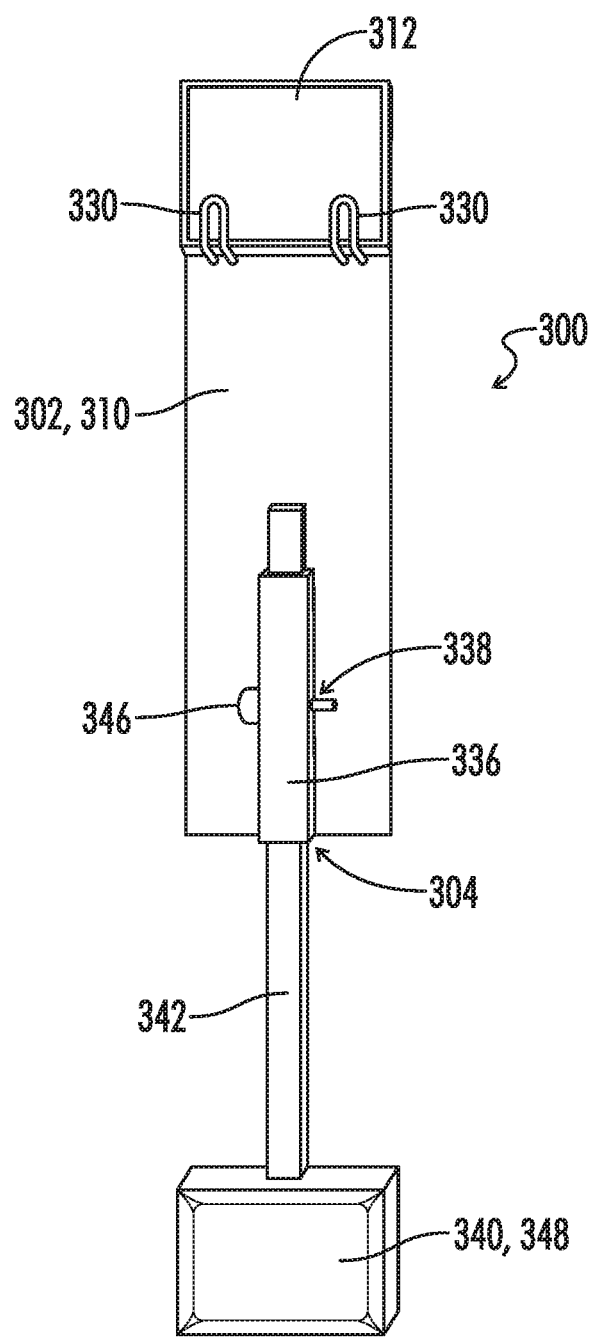
FIG. 12 is a front elevation view of yet another embodiment of a mannequin display apparatus.
Figure 13:
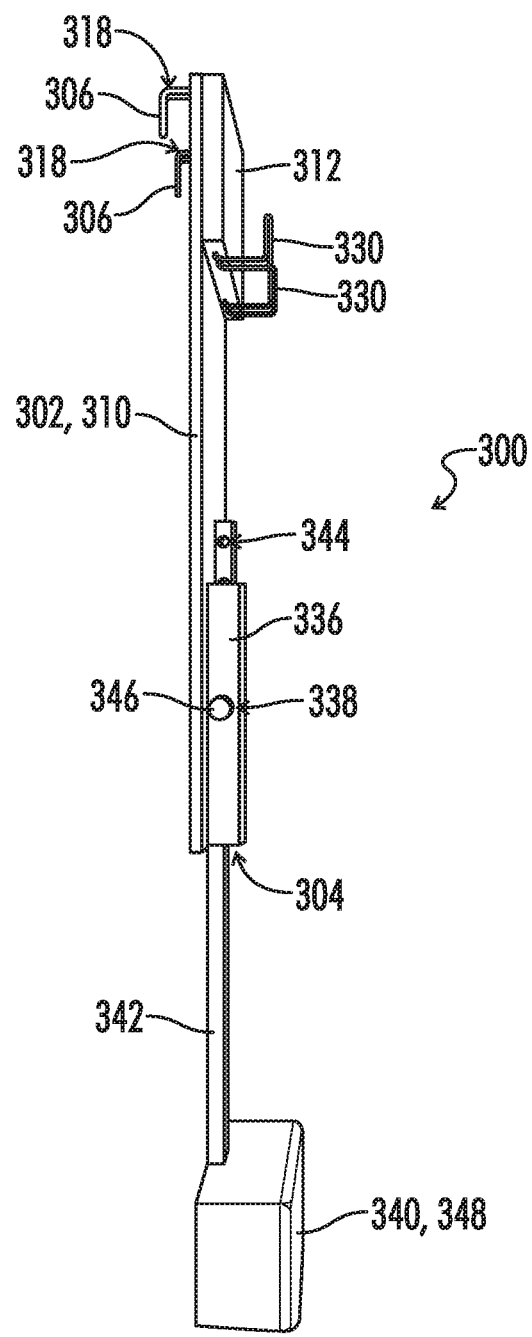
FIG. 13 is a side elevation view of the mannequin display apparatus of FIG. 12.
Figure 14:
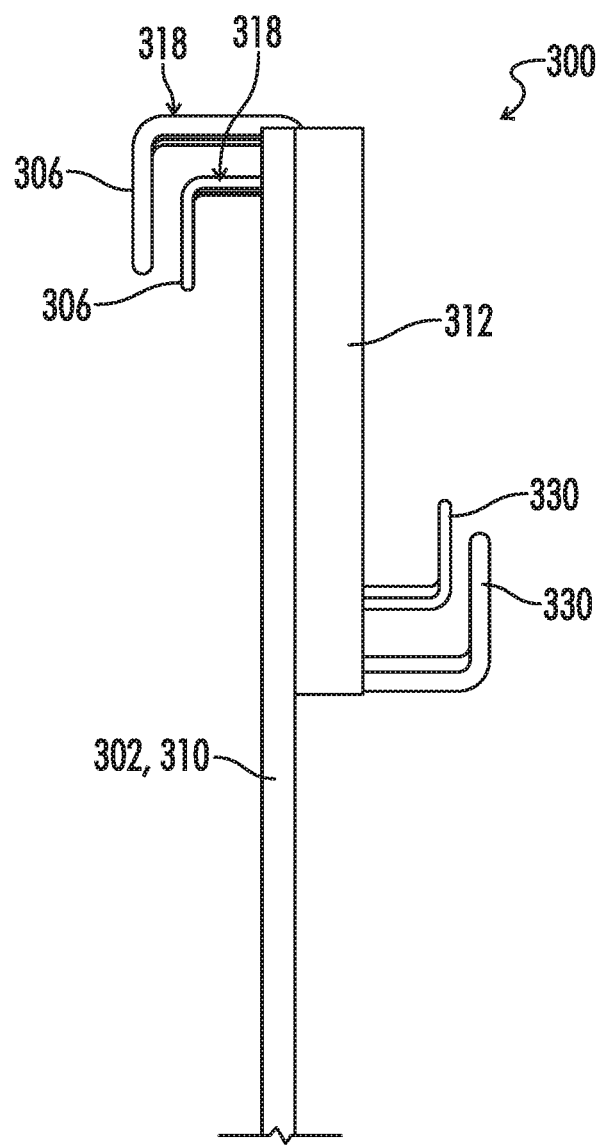
FIG. 14 is a detailed side elevation view of the door hooks and mannequin hooks of the mannequin display apparatus of FIG. 12.

Turning now to FIGS. 12-14, another embodiment of a mannequin display and staging apparatus 300 is shown. For components of the mannequin display and staging apparatus 300 that are similar or identical to the respective components of the previously described mannequin display and staging apparatus 200, the reference numeral for each given component will be the same number as above increased by a value of one hundred. As such, some components of the mannequin display and staging apparatus 300 may not be described herein for the sake of brevity.

The mannequin display and staging apparatus 300 may include at least one mannequin hook 330. In a particular embodiment, the at least one mannequin hook 330 may include two mannequin hooks. In such an embodiment, the above mentioned chain 232 and carabiner 234 (FIG. 2) may be used in conjunction with the mannequin hooks 330.

The mannequin display and staging apparatus 300 may also be without a rear plate discussed above. Instead, the door hooks 306 may simply be disposed between the intermediate plate 310 and the cover plate 312.

The door hooks 306 and the mannequin hooks 330 may further be constructed such that each door hook and a respective mannequin hook are formed of a single part. As such, each door hook 306 and corresponding mannequin hook 330 may be disposed between the intermediate plate 310 and the cover plate 312. In this embodiment, no mounting block as discussed above is required. Forming each door hook 306 and corresponding mannequin hook 330 of a single part may allow for a stronger construction that is able to bear more weight than other designs.

Figure 15:
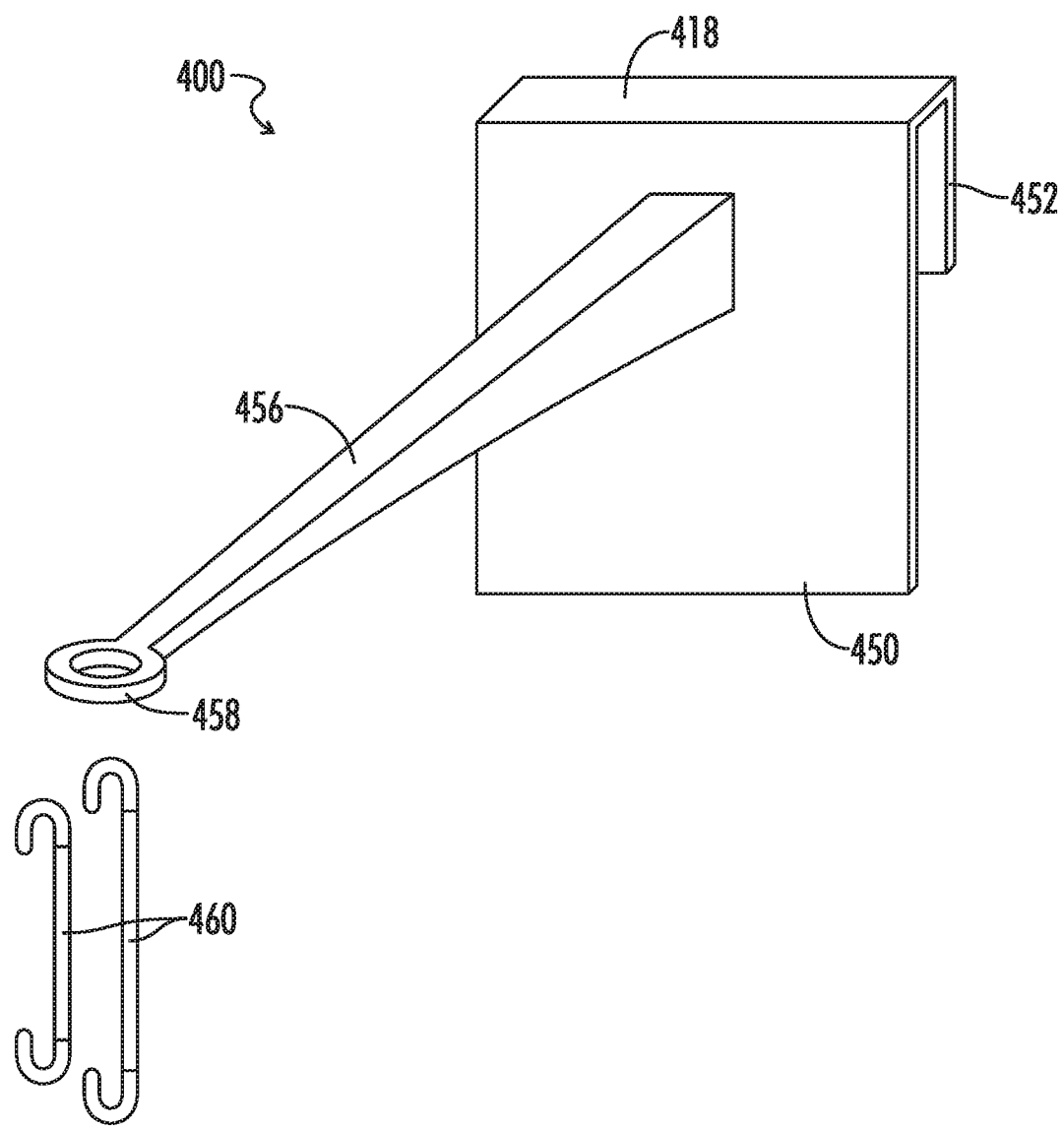
FIG. 15 is an isometric view of still another embodiment of a mannequin display apparatus.
Figure 16:
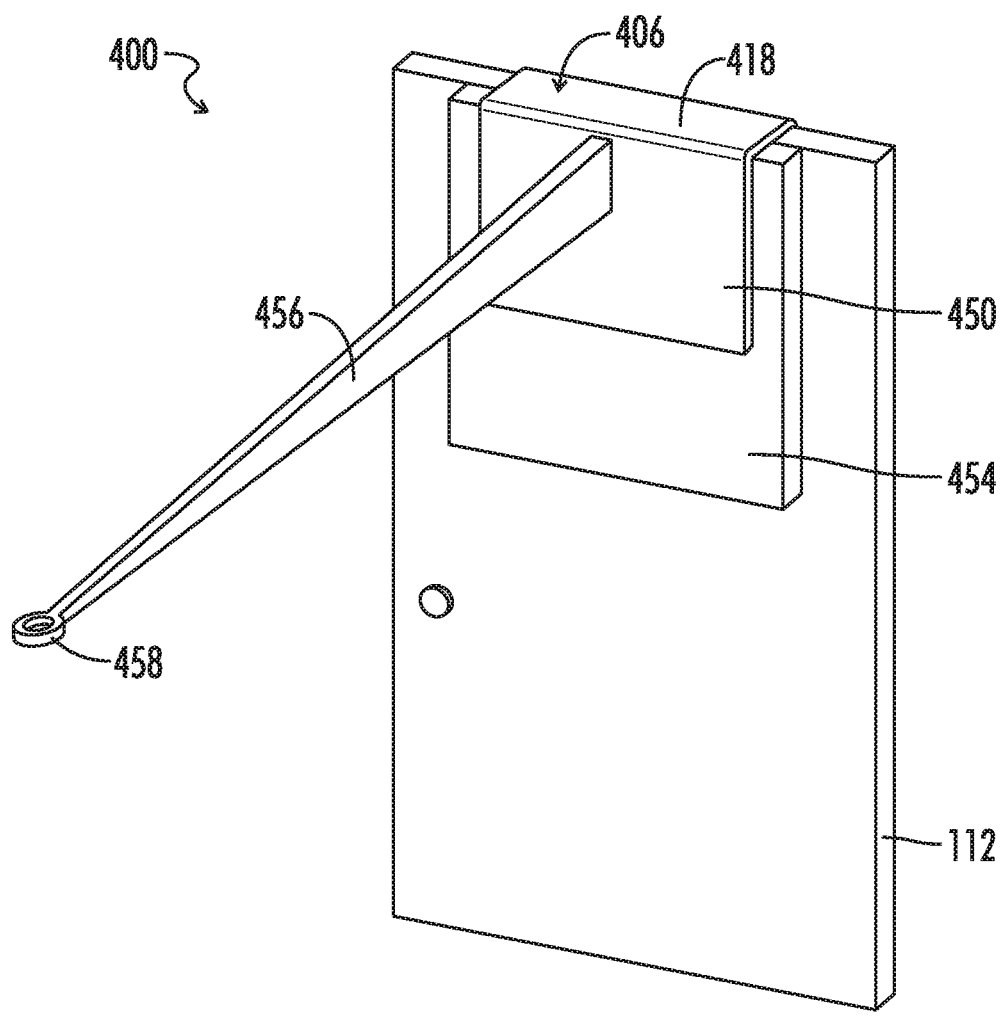
FIG. 16 is an isometric view of the mannequin display apparatus disposed on a door of FIG. 15.

Turning now to FIGS. 15-16, yet another embodiment of a mannequin display and staging apparatus 400 is shown. In this embodiment, the apparatus 400 includes a door hook 406 having a top section 418 connected to both a front section 450 and a back section 452. In some embodiments, the front section 450 may be wider and/or longer than the back section 452. In other embodiments, the back section 452 may be wider and/or longer than the front section 450. The construction of the door hook 406 may allow for a better weight bearing capability, especially since no intermediate plate is included in this embodiment of the apparatus 400. In some embodiments, the door hook 406 may be wider than a corresponding thickness of a respective door 112. As such, a sacrificial panel 454 may be inserted between the door 112 and the front section 450 to bear any forces from the front section that might otherwise scratch or puncture the door. The mannequin display and staging apparatus 400 may further include a suspension member 456 extending from the front section 450 of the door hook 406. The suspension member 456 may include a connection point 458 in the form of a hook, eyelet, carabiner, and the like. A user may connect one or more elongate elastic members 460 to the connection point 458. The user may select an appropriate elongate elastic member 460 having a given resistance based on the weight of the mannequin. As such, the mannequin may be suspended by the elongate elastic member 460 by connecting the elongate elastic member to the eyelet on the mannequin. Additionally or alternatively, a harness (not shown) may be connected to the elongate elastic member 460 to suspend a mannequin.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A mannequin display and staging apparatus for mounting a mannequin to a door, the mannequin display and staging apparatus comprising:
   a base panel, the base panel including an intermediate plate wherein the intermediate plate has a front side, a rear side, and at least one connection hole defined therein, the at least one connection hole of the intermediate plate corresponding to an at least one connection hole defined on at least one door hook allowing the at least one door hook to be fastened to the intermediate plate, and a rear plate connected to the rear side of the intermediate plate, the rear plate having at least one channel to receive the at least one door hook;
   the at least one door hook connected to the base panel, the at least one door hook configured to receive a top portion of the door;
   at least one mannequin hook connected to the base panel, the at least one mannequin hook configured to receive an attachment portion of the mannequin;
   a passageway defined in the base panel; and
   a rest including a mounting projection, the mounting projection slidably received in the passageway of the base panel configured to allow the rest to be adjustable.

2. The apparatus of claim 1, wherein the base panel further comprises:
- a cover plate connected to the front side of the intermediate plate, the cover plate covering the at least one connection hole defined in the intermediate plate.

3. The apparatus of claim 1, further comprising:
- a mounting block connected to the intermediate panel, the mounting block having at least one hook opening defined therein, at least a portion of the at least one mannequin hook received in the at least one hook opening.

4. The apparatus of claim 1, further comprising:
- the base panel including a tunnel member forming the passageway to slidably receive the mounting projection;
- the mounting projection including a plurality of adjustment holes defined therein;
- at least one set point opening defined in the tunnel member and intersecting the passageway; and
- a pin disposed in the at least one set point opening and one of the plurality of adjustment holes.

5. The apparatus of claim 1, wherein:
- the base panel includes a base panel top surface; and
- the at least one door hook is at least partially recessed in the base panel top surface to allow the door to be closed while the apparatus is mounted to the door.

\* \* \* \* \*